United States Patent [19]

Hair

[11] Patent Number: 4,697,549
[45] Date of Patent: * Oct. 6, 1987

[54] APPARATUS FOR SUSTAINED DISPENSATION OF A CHEMICAL AGENT

[76] Inventor: Jakie A. Hair, Route 5, Box 188A, Stillwater, Okla. 74074

[*] Notice: The portion of the term of this patent subsequent to Mar. 26, 2002 has been disclaimed.

[21] Appl. No.: 588,578

[22] Filed: Mar. 12, 1984

Related U.S. Application Data

[63] Continuation-in-part of Ser. No. 428,641, Sep. 30, 1982, Pat. No. 4,506,630.

[51] Int. Cl.⁴ .......................... A61D 7/00; B67D 3/00
[52] U.S. Cl. .......................................... 119/156; 47/1.5
[58] Field of Search ............................ 119/156; 47/1.5

[56] References Cited

U.S. PATENT DOCUMENTS 4,187,638  2/1980  Hardy et al. .......................... 47/1.5
4,219,964  9/1980  Dale ........................................ 47/1.5
4,506,630  3/1985  Hair ........................................ 119/156
4,606,478  8/1986  Hack et al. ...................... 119/156 X Primary Examiner—Paul J. Hirsch
Attorney, Agent, or Firm—Head & Johnson

[57] ABSTRACT

An apparatus for sustained dispensation of a chemical agent in minute quantities exteriorally of an animal, the chemical agent being such as a pesticide, insect repellent or other pharmacological agent, the apparatus including a small reservoir containing the chemical agent, a wick received within the reservoir and extending sealably exteriorally thereof, the wick having a diameter of not greater than about 5 millimeters (preferably less than 1 millimeter) and of length exteriorally of the reservoir of about 1 inch, the reservoir and contents having a weight of not more than about 10 grams, and a housing for retaining the reservoir exteriorally of the body of an animal.

6 Claims, 12 Drawing Figures

APPARATUS FOR SUSTAINED DISPENSATION OF A CHEMICAL AGENT

CROSS-REFERENCE TO RELATED APPLICATIONS

This is a continuation-in-part of application Ser. No. 428,641 entitled "Apparatus for Sustained Dispensation Of A Chemical Agent Exteriorally Of An Animal", filed Sept. 30, 1982, now U.S. Pat. No. 4,506,630.

BRIEF SUMMARY OF THE INVENTION

The parent application, of which this is a continuation-in-part, describes apparatus for use in dispensing chemical agents exteriorally of the body of an animal such as for use on agricultural livestock, as well as on domestic pets like cats and dogs. The parent application discloses the basic concept of a small container or vial containing a small quantity of chemical agent, such as insecticide, insect repellent, or other pharmacological agent, and having a wick extending from it. The present disclosure is directed to improvements in this basic concept, including improved arrangements for the reservoir and for improved means of attaching the reservoir with its extending wick to the body of an animal.

The invention provides for a reservoir and holder which should not be of weight more than about 10 grams and, in many applications, of significantly less total weight. The reservoir has a wick extending from it and the wick is of small exterior diameter, like a thread, having a diameter of not more than about 5 millimeters and preferably a diameter less than 1 millimeter. The wick should extend from the reservoir a typical length of about 1 inch. The length of wick extending from the reservoir can be used to control the rate of dispensation of the chemical agent.

As contrasted to the prior art, such as revealed in U.S. Pat. Nos. 3,935,839 and 4,023,532 as examples, the present invention is directed towards dispensing very minute quantities over a sustained length of time and from a reservoir which can be comfortably affixed to the body of an animal without serving as an encumbrance or irritation to the animal.

One aspect of the invention is the provision of a carrier formed of a unitary piece of plastic which may be folded to receive a reservoir. In one arrangement the carrier is constructed so as to receive replaceable reservoirs.

As the liquid chemical agent is dispensed from a container there is a tendency to create a vacuum within the container. This can be compensated for by allowing air to enter the container as the liquid chemical is dispensed or, by providing a container which collapses as the liquid is dispensed. When the container is rigid or semi-rigid an air opening can be provided such as by extending a length of wick through the container which is of length substantially less than the portion of the wick dispensing the chemical. This can be achieved by passing the same wick through two entrances into the container, or by use of separate wicks.

DETAILED DESCRIPTION OF THE PREFERRED EMBODIMENT

Figures 1, 4, 10:
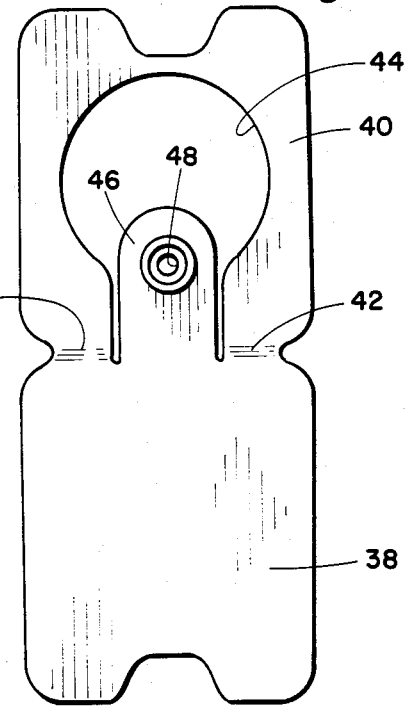
FIG. 1 is an isometric view of a vial as may be employed in practicing the principles of this invention to dispense minute quantities of a chemical agent. A wick extends sealably through the vial wall.
FIG. 4 is a cross-sectional view of a vial type reservoir showing a wick extending through two openings in the reservoir, one of the openings providing means for entrance for air as the liquid chemical is dispensed.
FIG. 10 is a plan view of a carrier for the reservoir of the type shown in FIG. 6.

Referring to the drawings, FIG. 1 illustrates an example of a type reservoir which may be employed in practicing the invention. It is understood that the specific configuration or construction of the reservoir is not a limiting factor in employing the invention. The reservoir must be of a relatively small size and weight so as not to be an encumbrance or hinderance to the animal to which it is applied. The reservoir of FIG. 1 is in the form of a vial 12 which is closed except for a small opening 14 which sealably receives a wick 16. The vial 12 may be very small, such as ½ to ¾ of an inch in length and 3/16 to ¼ inch in diameter, particularly when employed for domestic animals like dogs and cats, or it can be larger such as ½ to 3 inches in length and ⅜ to ½ in diameter for use on larger animals. The wick 16 is of small diameter not exceeding 5 millimeters. A typical size of wick 16 is less than 1 millimeter in diameter and the wick is preferably formed of a plurality of fine fibers which may be twisted like a thread or the fibers may be woven. The wick is formed of a fiberous flexible material which is not desolved by the chemical agent. The use of a wick made of fibers of Teflon is a preferred example of a material of which the wick 16 may be formed.

The wick may be very small, depending upon factors such as the viscosity of the chemical agent, the concentration, that is the rate at which it needs to be dispensed, the wettability of the wick material to the specific chemical agent, and the length of the exposed wick. The wick may be as small as 0.01 mm in diameter, although a more practical size, based on experiments to date, indicates the use of wicks of about 0.1 to 0.22 mm in diameter for very concentrated chemical agents, and larger diameters such as 0.25 to 1 mm for less concentrated agents. The use of wicks made of Teflon fibers whether twisted, woven, or braided, have performed satisfactorily.

The chemical agent which is retained in reservoir 12 is in the form of a pharmacologically active agent, usually in a carrier liquid. The carrier most frequently employed at the present time for dispensing pharmacological active agents is xylene. Therefore the reservoir should be of a material which resists xylene and therefore it may be of metal, teflon, polypropylene, polyethelene or a product having the Trademark "BAREX" as manufactured by DuPont Corporation. The reservoir does not have to contain a liquid under pressure and therefore the walls of the reservoir may be relatively thin, such as 10 mills or less.

Wick 16 which extends sealably through the opening 14 in the vial serves to dispense the chemical agent in minute quantities so that a relatively small volume of liquid chemical agent can be used on an animal for an extended length of time, such as up to four or six months. The length of the wick extending exteriorally of the reservoir should be on the order of about 1 inch although a longer or shorter wick may be employed and the length of the wick is a good means of controlling the rate is dispensation. The actual rate of dispensation from the reservoir 12 will depend upon the diameter of the wick, its make-up, that is the density of fibers of which it is formed, the wettability of the chemical agent to the type wick used, the diameter of the wick, and its length. Thus the length, as one of the factors controlling the rate of dispensation, can be used easily to adjust the dispensation rate. When a reservoir is supplied with a relatively longer wick and a reduced rate of dispensation is desired, the user can merely clip off a portion of the length of the wick to attain the reduced rate. As previously indicated, length of wick 16 of about 1 inch is typical since this length will not interfere or be a nuisance to the animal carrying the reservoir.

Figure 3:
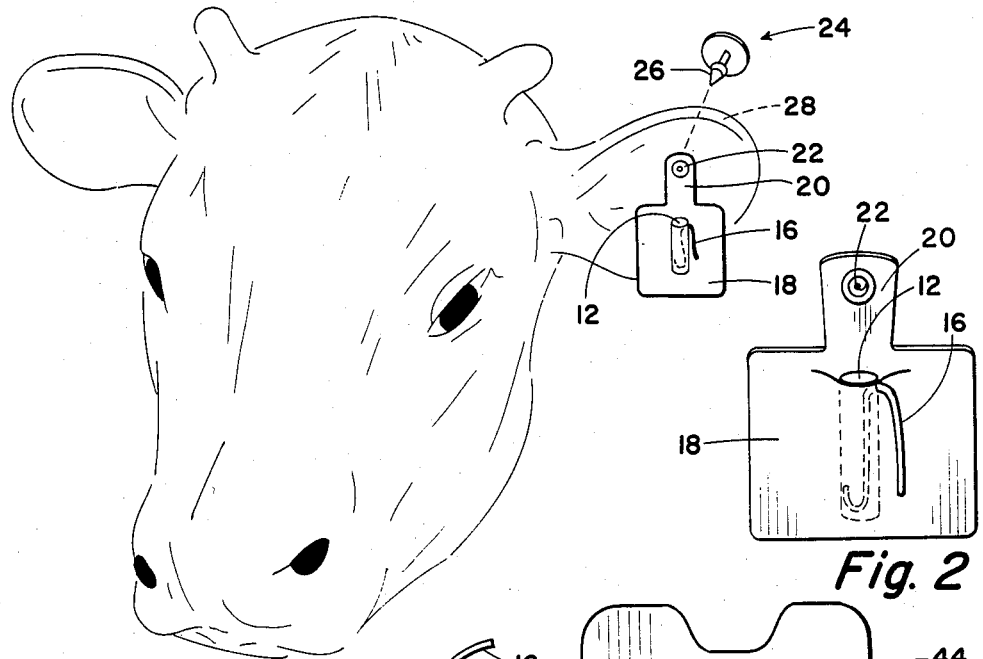
FIG. 3 shows, in dotted outline, the head of a bovine and showing an ear tag affixed to the animals ear supporting a chemical dispensing vial as employed in this invention. A pin member having a pointed end is shown. The pin member is extended through the pinna portion of an animals ear and through an opening in the ear tag by which ear tag is retained to the animals ear.
Figure 2:
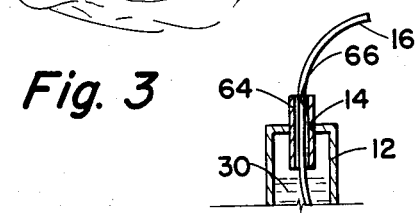
FIG. 2 shows an ear tag such as may be employed for attachment to the ear of an agricultural animal and showing the ear tag having a pouch receiving a vial type reservoir of FIG. 1.

FIG. 2 shows the reservoir 12 contained in a pouch formed in an ear tag 18. The ear tag has an integral extending tongue portion 20 having a reinforced opening 22 therein. By means of a retainer 24 (See FIG. 3) having an elongated portion with a pointed end 26 which may be extended through the pinna portion 28 of the ear of an animal, such as a bovine, the pointed end 26 extending through the opening 22 in the ear tag, the ear tag is held in place. By means of the pouch the reservoir 12 may be replaced as necessary.

When liquid chemical agent is dispensed from a reservoir a vacuum is created in the reservoir unless the volume of the reservoir changes or unless air is admitted to take the place of the dispensed liquid. The reservoir may be constructed to collapse to compensate for the reduced liquid volume. A means of admitting air into a reservoir is illustrated in FIG. 4. FIG. 4 is a cross-sectional view of a vial type reservoir 12 showing a chemical agent 30 therein. Wick 12 extends exteriorally of the vessel through opening 14 and in addition, extends through a second opening 32. The wick 16 is terminated at or adjacent the exterior wall of the vessel so that it serves to sealably close the second opening 32 except for the passage of air. There is a tendency for the wick extending through second opening 32 to dispense chemical however, since the wick extending through the first opening 14 is substantially longer the osmotic effect of the longer extending wick portion through opening 14 will tend to cause the chemical to flow out through the first opening 14. Thereby any slight subatmospheric pressure created by the flow of chemical out first opening 14 tends to draw air through the opening 32. The wick 32 could extend beyond the exterior surface of the vessel 12 for a short length if desired; however, for best results the length of the wick extending through one opening should be substantially greater than that extending through the other opening. In addition, in the arrangement of FIG. 4 a single wick 12 is employed extending through both openings 14 and 32 while the same results can be achieved by different wicks extending through opening 14 and 32.

Figure 6:
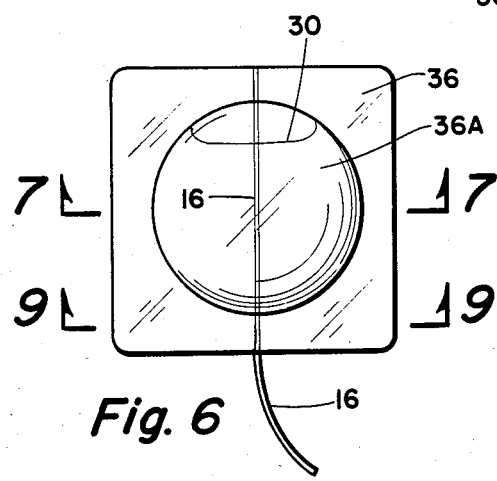
FIG. 6 is a plan view of one type of reservoir which may be employed in practicing the invention, the reservoir being formed of two sheets of thin plastic material, one of the sheets having a recess embossed in it which, when the sheets are bonded together, forms the chemical containing reservoir.
Figure 7:
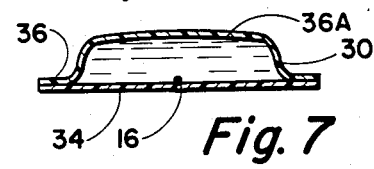
FIG. 7 is a cross-sectional view taken along the line 7—7 of FIG. 6.
Figure 9:
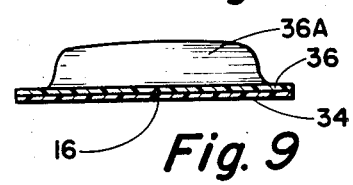
FIG. 9 is a cross-sectional view taken along the line 9—9 of FIG. 6 showing the means of passing the air venting portion of the wick through the housing portions.

FIGS. 6, 7 and 9 show a different type of reservoir construction formed of two pieces of thin plastic material, the plastic being of a thickness such as about 10 mills. A base sheet 34 has secured to it a top sheet 36 which is molded to provide a reservoir forming recess 36A. The top sheet 36 is sealed against the bottom sheet 34 around the entire periphery of the reservoir forming recess 36A. The top sheet 36 may be of transparent material to reveal the quantity of chemical agent 30 remaining in the reservoir.

Wick 16 is positioned between the bottom sheet 34 and the upper sheet 36 before the two sheets are sealed together. Sealing may be accomplished by heat and pressure fusion around the periphery of the reservoir portion 36A. This causes the plastic material to form around the wick 16. Alternatively, top and bottom portions 36 and 34 may be chemically bonded to each other.

Figure 8:
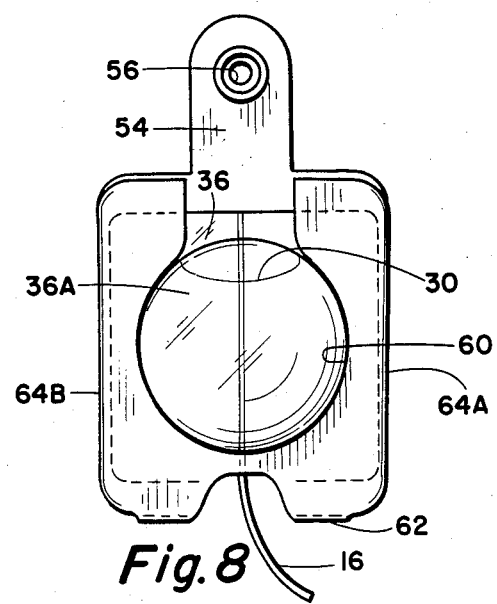
FIG. 8 is an elevational view of an apparatus for agricultural type animals formed of the plastic member of FIG. 5 and the reservoir of FIG. 6. The edges of the folded plastic member of FIG. 5 are sealed, leaving the top opened so the reservoir can be removed and replaced.

As shown in FIGS. 6, 7 and 8, the wick 16 extends out the bottom of the reservoir for a length such as approximately 1 inch. At the top of the reservoir the wick is trimmed to coincide with the edge of the plastic sheets 34 and 36 to thereby serve as an air vent as previously described with reference to FIG. 4.

The configuration of the reservoir of FIGS. 6, 7 and 8 is merely exemplary and it can be seen that the reservoir may be of any desired shape however, forming the reservoir of two sheets of plastic, one or both having a reservoir forming recess formed therein is illustrative of an inexpensive and effective means of practicing the invention.

Figure 11:
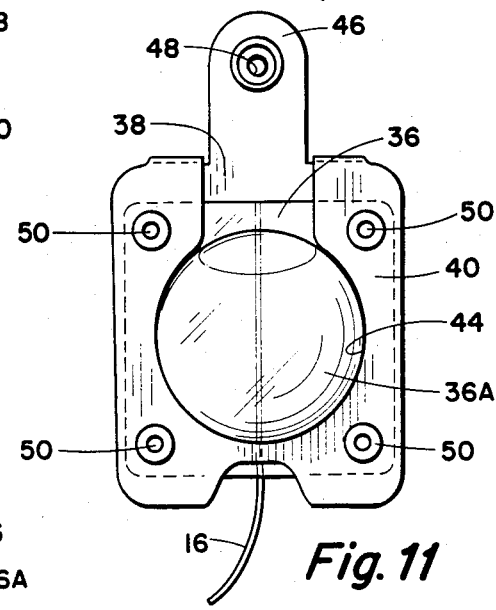
FIG. 11 is a dispensing device formed of the carrier of FIG. 10 with the top portion folded down and receiving a reservoir of the type shown in FIG. 6.

FIGS. 10 and 11 show a carrier which may be employed with the reservoir of the type shown in FIG. 6. The carrier can be formed of a flat sheet as shown in FIG. 10. The flat sheet has a back portion 38 and a front portion 40 joined by a fold line 42. An opening 44 is formed in the front portion 40 and an integral tongue portion 46 extends from the base portion 38. The tongue portion 46 has an opening 48 which may be reinforced by increased thickness areas around the opening. FIG. 11 shows the carrier of FIG. 10 folded in position with the reservoir of FIG. 6 received between the two folded portions. The opening 44 formed in the carrier is of a diameter to receive the reservoir area 36A. Brads 50, which can be of the plastic type, may then be positioned in the four corners of the container, the brads also extending through the reservoir upper and lower sheets 34 and 36, to retain the reservoir in position within the carrier. The use of brads is illustrative of one means of retaining the reservoir in the folded carrier. Alternatively, the carrier edges may be sealed or the carrier peripheral portions sealed to the reservoir as examples of other methods of forming the carrier and reservoir combination. The carrier of the type shown in FIGS. 10 and 11 may be of the type such as employed as the ear tag 18 of FIG. 3.

Figure 5:
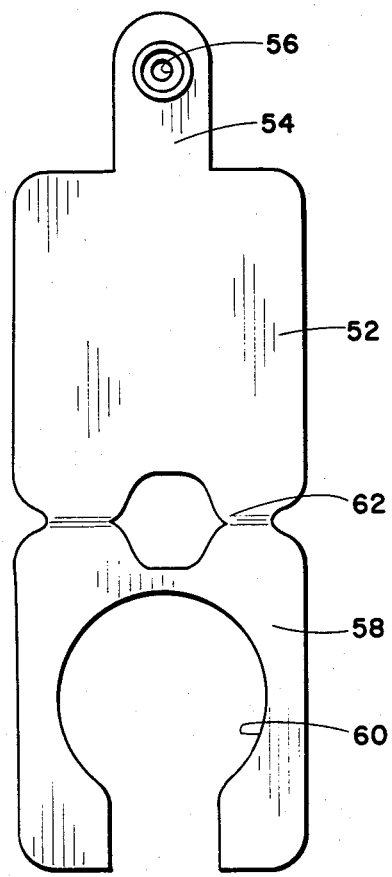
FIG. 5 is a planar view of a unitary piece of plastic cut into a configuration which may be folded to provide means for supporting a chemical dispensing reservoir.

FIGS. 5 and 8 show an alternate arrangement of the carrier of FIGS. 10 and 11. In FIG. 5 the back portion 52 includes an integrally extending tongue 54 having an opening 56 therein. The front portion 58 has a cut-out 60, the portions 58 and 52 being joined at a fold line 62.

FIG. 8 shows the front portion 58 folded up over the back portion 52 with the two portions joined, such as by heat or chemical fusion, along their opposed parallel edges 64A and 64B. This leaves the top of the device open so that a reservoir of the type shown in FIG. 6 may be slipped into the holder between the back and front portions 52 and 60. The cut-out 60 in the front portion 58 conforms to and receives the reservoir portion 36A. When the chemical agent 30 has been consumed from the reservoir 36A the device may be removed by slipping it out the top, the upper portions of the front portion 58 of the retainer being flexed outwardly to allow passage of the reservoir. A new reservoir may then be installed.

Where a reservoir is applied to an animal in a manner such that the reservoir will have a top and bottom, the second opening 32 should be in the top and the first opening 14 in the bottom, as illustrated in FIGS. 6, 8 and 11. In this way, the wick extending through second opening 32 which is intended to admit air into the reservoir, and communicates with the air pocket formed above the liquid in the upper portion of the reservoir.

Figure 4A:
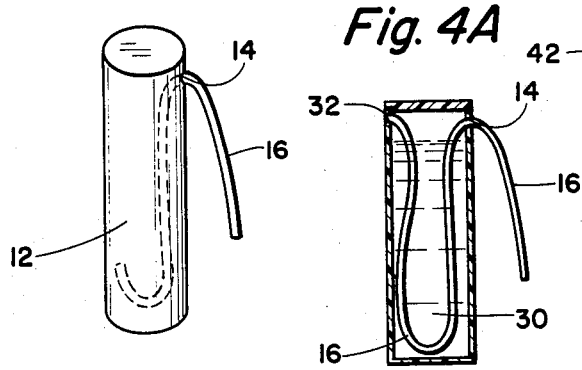
FIG. 4A is a fragmentary cross-sectional view of an alternate embodiment of the vessel of FIGS. 1 and 4, including the use of a small tube in the vessel which receives a wick, the tube also serving means of venting the vessel to prevent the creation of a vacuum as liquid is dispensed.

FIG. 4A shows an alternate means of venting a vessel 12. Secured in opening 14 is a small diameter, short length tube 64 having a tubular passageway 66 therethrough. The diameter of passageway 66 is preferably slightly greater than the diameter of wick 16, providing an annular area between the wick and the passageway. The annular area should be dimensioned such that fluid will not readily, in the absence of a pressure differential, flow out of a vessel 12, through the annular area. When fluid is dispensed by wick 16, a negative pressure differential (vacuum) will gradually build within the interior of the vessel. When such differential raises to a small, preselected amount, air can flow into the interior of the vessel through the annular area between the exterior of the wick and the wall of passageway 66. In like manner, if a pressure above a preselected level builds within the interior of vessel 12, gas will be forced out of the vessel through the annular area to avoid the possibility of the vessel rupturing.

The invention herein described thus provides a unique means of dispensing minute quantities of chemical agents exteriorally of the body of animals including improved means of constructing the reservoirs, for venting the reservoirs for allowing air to flow therein as the chemical agent is dispensed, and for improved means of mounting the reservoirs in carriers for attachment to the body of animals.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A method for the control of arthropod pests of a warm-blooded animal comprising:
   securing a container of liquid pesticide to a warm-blooded animal;
   dispensing said pesticide from said container through a synthetic fiber wick extending in part from said container; and
   controlling the rate at which said pesticide is dispensed from said container to effect the control of arthropod pests of said warm-blooded animal.

2. Apparatus for sustained dispensation of a chemical agent in minute quantities, the chemical agent being such as a pesticide, insect repellent, or other pharmacological agent, comprising:
   a small reservoir having a reservoir wall and containing a chemical agent;
   a short length tube received in said reservoir wall and extending exteriorly thereof;
   a wick received within said reservoir and extending exteriorly thereof through said tube wherein the internal diameter of said tube is slightly greater than the external diameter of said wick providing an annular area therebetween, the dimensions of such annular area being such that flow of liquid therethrough is prevented but the passage of air is permitted whereby pressure within said vessel is equalized; and
   means of retaining said reservoir exteriorly of the body of an animal.

3. Apparatus for sustained release of a chemical agent according to claim 2 wherein said wick has a diameter not greater than about 5 mm.

4. Apparatus for sustained release of a chemical agent according to claim 2 wherein said wick is formed of a plurality of strands of plastic material.

5. Apparatus for sustained release of a chemical agent according to claim 2 wherein the length of wick extending from said reservoir is not greater than about 1 inch.

6. Apparatus for sustained release of a chemical agent according to claim 2 wherein said means of retaining said reservoir exteriorly of the body of an animal includes means of retaining said reservoir to the pinna portion of the animal's ear and wherein the weight of said reservoir, chemical agent, wick and retention means does not exceed about 10 grams.

* * * * *